March 29, 1932.  W. H. WEISKOPF  1,851,026
MEANS FOR TEMPORARILY SUPPORTING STRUCTURAL ELEMENTS
Filed Jan. 14, 1930  2 Sheets-Sheet 1

INVENTOR
Walter H. Weiskopf,
BY
Frederick Breitenfeld
ATTORNEY

March 29, 1932. W. H. WEISKOPF 1,851,026
MEANS FOR TEMPORARILY SUPPORTING STRUCTURAL ELEMENTS
Filed Jan. 14, 1930 2 Sheets-Sheet 2
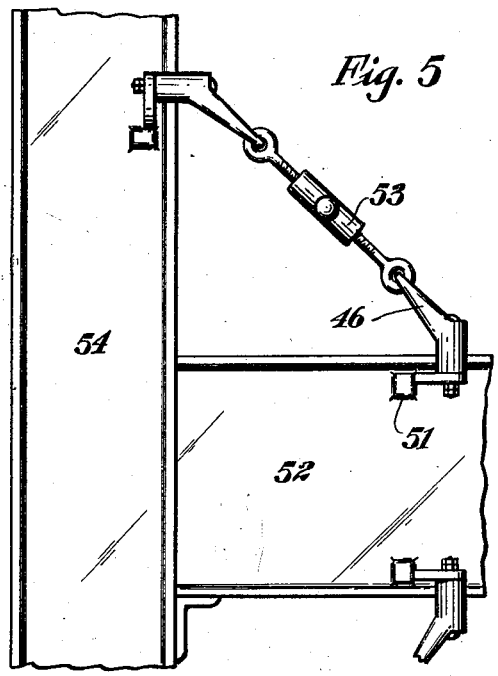
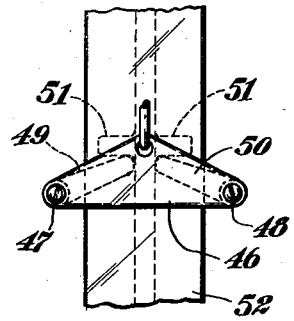
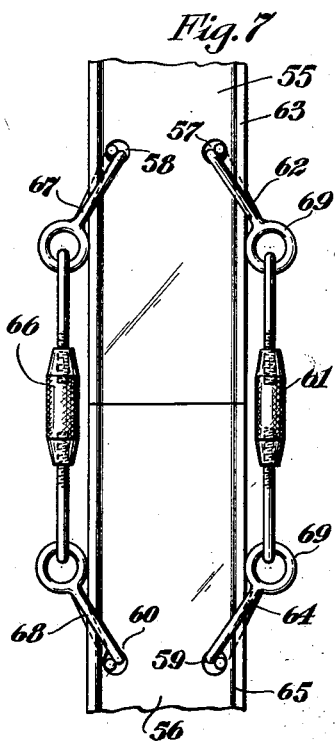
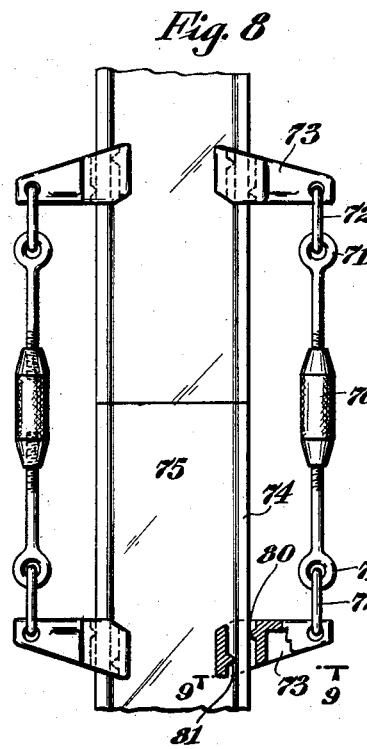
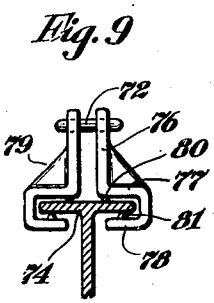
INVENTOR
Walter H. Weiskopf,
BY
Frederick Breitenfeld
ATTORNEY Patented Mar. 29, 1932

1,851,026

UNITED STATES PATENT OFFICE

WALTER H. WEISKOPF, OF CEDARHURST, NEW YORK

MEANS FOR TEMPORARILY SUPPORTING STRUCTURAL ELEMENTS

Application filed January 14, 1930. Serial No. 420,650.

My present invention relates generally to steel structures, more particularly to building structures, and has particular reference to certain improvements relating to the art of steel erection by means of welding as distinguished from riveting.

My present application constitutes a continuation in part of my co-pending application Serial No. 214,033.

The advantages of welding, as compared with riveting, are known to those skilled in the art and are briefly outlined in the foregoing pending application. As pointed out in said application, one of the problems arising in the relatively new art of steel erection by welding lies in the temporary retention of beams and columns in proper and firm relationship preparatory to the actual welding operations.

It is a general object of my present invention to provide a method and means for temporarily retaining structural steel elements or beams in proper relationship and position, preparatory to the mutual welding thereof, without the employment of bolts, rivets, or any other similar devices necessitating a preliminary preparation of accurately aligned holes or the like. More particularly, my invention provides a temporary tie device capable of removable application to the various beams, columns, and other structural steel elements, at a variety of points, and in a variety of ways for securely holding such elements together and in abutment with each other preparatory to the welding operations which follow thereafter.

A general object of my invention is to provide a device which may be employed repeatedly, which is adaptable to the necessarily variable sizes and positions of the structural elements with which it is to be used; one which is simple and inexpensive to manufacture, easy to apply and use, equally simple to remove, yet efficient and absolutely reliable in fulfilling its important function.

Briefly, my device consists of a medial tie portion provided with means for adjusting the length thereof, and means associated with the ends of such tie portion for releasably grasping the beams which it is desired to retain in abutting relationship. I provide, for example, at least one pair of relatively adjustable gripping jaws which are so constructed and arranged that a firm grasp may be effected under a variety of necessarily differing conditions presented by the varying sizes and positional relationships of the particular beams with which they are employed.

One feature of my present invention lies in providing a device which is designed to engage the web of a structural steel beam. This may be accomplished either by positive engagement with the web or by purely frictional association therewith. The positive engagement may be effected by passing suitably prepared jaws through perforations in the web or webs, or by providing abutments or lugs on the web against which jaw members may find support.

In a modified construction, the jaws are adapted to engage the flanges of the structural steel beams and are so designed that the firmness of engagement is increased as the medial tie portion is shortened in length.

For the attainment of the foregoing objects and such other objects as may hereinafter appear or be pointed out, I have constructed a device embodying the features of my invention and illustrated in the accompanying drawings wherein—

Figure 5 is a view similar to Figure 1, showing a further modification;

Figure 6 is a fragmentary plan view taken substantially along the line 6—6 of Figure 5;

Figure 7 is a vertical side view similar to Figure 1, showing a slightly different application of my tie device;

Figure 8 is a view similar to Figure 7, showing a modification; and

Figure 9 is a fragmentary cross-sectional view taken substantially along the line 9—9 of Figure 8.

Figure 1:
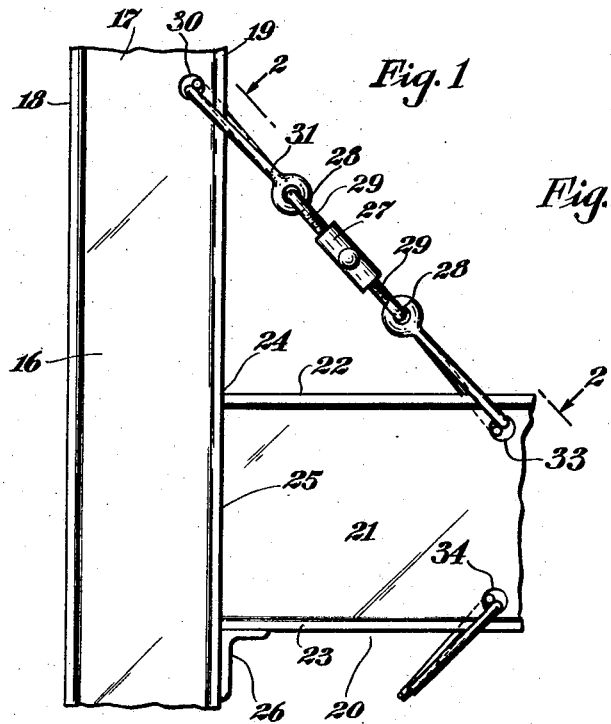
Figure 1 is a vertical side view of a typical flanged column and a flanged beam abutted thereagainst, showing one form of my invention applied thereto.

In Figure 1, I have shown a typical structural steel column 16 having a medial web portion 17 and two parallel outer flanges 18 and 19, the column illustrated being of H cross-section. Abutted thereagainst, perpendicularly, I have shown a typical I-beam 20 provided with a web 21 and top and bottom flanges 22 and 23. The beam 20 is abutted against the flange 19, and when the structure is ultimately welded, a bead of welding will probably be applied in the angle 24 and also in the angles 25 on opposite sides of the web 21.

In an abutment of this character, I have found it desirable to provide an angle 26 upon the flange 19, whereby the end of the beam 20 may be initially rested upon this angle after it is raised by the derrick or hoist and before or during the application of the present temporary tie devices. The angle 26 is not intended to serve any permanent supporting function.

Figure 2:
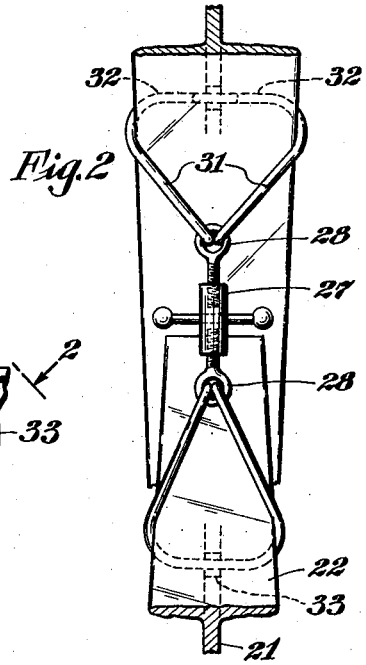
Figure 2 is a diagonally downward view taken along the line 2—2 of Figure 1.

In Figures 1 and 2, I have shown a tie device having the medial adjustable tie portion 27, the latter being provided with loops 28 at its opposite ends. The adjustability is provided for by mounting the loops 28 upon threaded shank portions 29 engaging with the opposite ends of an internally threaded adjusting member.

Carried by each loop 28 are two relatively adjustable gripping jaws 31, these jaws being looped at their rear ends to engage with the loop 28. The jaws extend divergently away from the loop 28 and have their outer ends 32 disposed inwardly and of sufficient length to engage with the web 17. A similar set of jaws may be arranged at the other end of the tie portion 27 and in association with the other loop 28.

It is to be noted that the jaws 31 extend around the flange of the beam with which they are associated, and that these jaws thereupon engage in a positive manner with the web of such beam. In the construction of Figures 1 and 2, the engagement with the web is a positive one, since I provide a perforation 30 in the web 17 and a similar perforation 33 in the web 21. These perforations are preferably made in the shop during the manufacture of the beam, but they differ from rivet holes or the like because an accurate positioning thereof is not essential. They may also be provided in the field, at any convenient point or points, for the purpose of receiving the jaw ends 32 therethrough.

In Figure 1, I have shown the two ends 32 passing in overlapping relationship through the perforation 30, but it will be understood that this is not essential and each jaw may be caused to pass through its own individual opening in the web. It will also be understood that whereas I have shown one tie device, another symmetrically positioned tie device will probably extend downwardly from a perforation 34 for the purpose of balancing the pull of the beam 20 toward the column 16.

It is to be noted that the ends 32 are of circular cross-section so that when they engage within an opening of the character shown they may find firm support regardless of the obliquity which the tie device as a whole assumes. The angularity of the tie device will of course depend upon the relative positions of the perforations in the webs, and this positional relationship will vary in different cases but will have no effect upon the firmness with which my device holds the two beams in association.

It will be found that this manner of holding the beam 20 in abutment with the column 16 is sufficiently staunch and reliable to permit a number of additional stories of structural steelwork to be erected in this manner. And it will be understood that after the welding has been effected, the tie devices are removed and are then ready for reemployment at other similar portions of the structure. The circular shape of the loops 28 and the construction of the jaws 31 render the latter adjustable in a lateral direction and permit the same to be applied to beams having flanges of different widths. The lengths of the ends 32 are preferably so designed that they will extend to and through the web in a substantial number of cases encountered in the field. Where differences in size are extreme, tie devices of slightly larger web dimensions may be employed.

Figure 3:
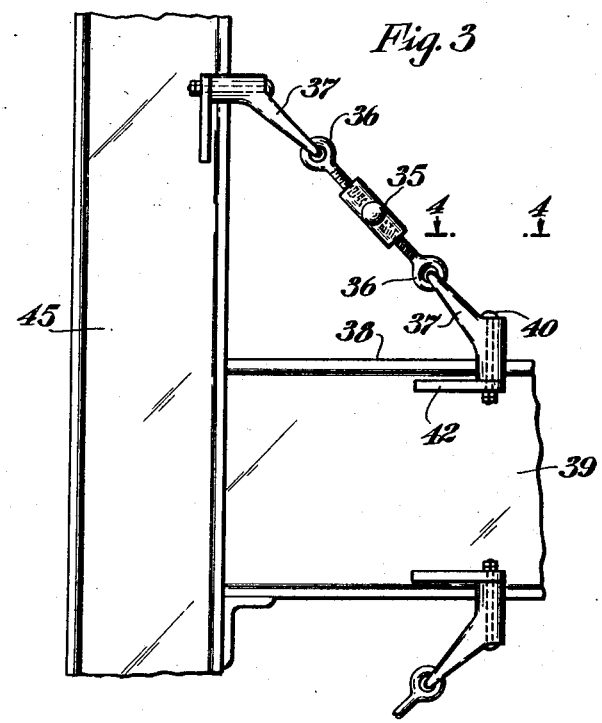
Figure 3 is a view similar to Figure 1, showing a modified form of tie device.
Figure 4:
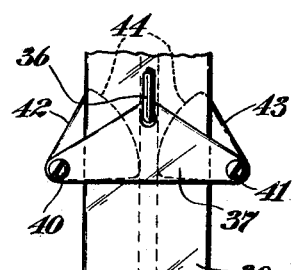
Figure 4 is a fragmentary plan view taken substantially along the line 4—4 of Figure 3.

In Figures 3 and 4, I have shown a similar type of device wherein the provision of perforations in the webs has been dispensed with. A medial tie portion 35 is again provided with the two loops 36. Associated with each loop is a supporting member 37 which is adapted to overlie the adjacent flange. Thus, in Figures 3 and 4, I have shown the loop 37 overlying the upper flange 38 of the horizontal beam 39. Pivoted, as at 40 and 41, to the opposite ends of the member 37 are the cam jaws 42 and 43. These jaws are positioned beneath the flange 38 and are disposed inwardly toward the web of the beam 39. They have curved surfaces 44 which wedge the web between them when tension is exerted upon the member 37 by a shortening in length of the medial portion 35.

A description of one side of this modified tie device will be sufficient since the other end is similarly constructed. In this case, although the engagement is again with the webs of the two beams, it is a purely frictional engagement. This construction will be found satisfactory to hold the beam 39 in the desired abutting relationship with the column 45.

In Figures 5 and 6, I have shown a device similar to that of Figure 3 wherein the engagement is again a positive one. In this form, I provide a supporting member 46 which overlies the adjacent flange, and pivoted as at 47 and 48 to the opposite ends are a pair of inwardly disposed jaws or fingers 49 and 50. I have shown these jaws resting against abutments or lugs 51 provided on opposite sides of the web of the beam 52. When this device is used, a blow with a hammer or the like will force the jaws 49 and 50 inwardly into firmly wedged relationship behind the abutments 51, and when the medial tie portion 53 is shortened in length, the beam 52 is drawn firmly up against the column 54 and held in rigid association therewith.

To illustrate the manner in which my device is not of necessity limited to the support of angularly disposed structural steel beams, I have shown in Figure 7 an application of my tie devices to a pair of beams or columns 55 and 56 held in abutment end to end. I provide perforations 57 and 58 in the beam 55, and similar perforations 59 and 60 in the beam 56. A tie device having the medial tie portion 61 is provided with the jaws 62 which engage around the flange 63 and through the perforation 57; and with a similar set of jaws 64 which extend around the flange 65 and through the perforation 59. A similar tie device has the medial adjustable portion 56, the jaw 67 engaging with the perforation 58, and the jaw 68 engaging with the perforation 60.

It is to be noted that the medial tie portions lie alongside of the beam and substantially parallel to the latter. In this type of device, I prefer to provide the intermediate loops or rings 69 between each medial tie portion and the jaws carried thereby, these rings or loops resting upon the flanges of the beams and keeping the medial portions slightly spaced from the flanges so as to render adjustment thereof capable of easy accomplishment.

Here, too, although I have shown one perforation for each pair of jaws, additional perforations may, if desired, be provided, or it may be advisable in some instances to provide a single perforation through which both the jaws 62 and 67, for example, might be caused to pass. In any event, it is to be noted, however, that the provision of the perforations is a matter of extreme simplicity, since their position need not be accurate. The lateral adjustability of the jaws, together with the adjustability in an oblique direction by virtue of the ring 69, and the circular cross-section of the jaws, enables the device to find a firm engagement with the desired webs in all cases.

In Figures 8 and 9, I have shown a device used for a purpose similar to that shown in Figure 7, wherein the jaws are so constructed that firm frictional engagement with the flanges, as distinguished from the webs, is accomplished. This construction is particularly adapted to the maintenance of two end to end beams in abutting relationship, although it is not limited to this use. A medial tie portion 70 is provided with the loops 71 and the links or rings 72. A pair of jaws 73 is associated with each link 72 and engages about the adjacent flange. The jaws 73 of Figure 8 engage around the flange 74 of the beam or column 75.

Each jaw has a rear portion 76 apertured to permit positioning thereof upon the link 72, and extending angularly away from the longitudinal axis of the tie portion 70. The end of the jaw is substantially U-shaped, having portions 77 and 78 adapted to engage with opposite surfaces of the flange 74 respectively. A stiffening web 79 may advantageously extend between the portions 76 and 77.

The portion 77 is provided with a projection or point of contact 80, and the portion 78 is provided with a similar point of contact 81, these points being offset with respect to each other both longitudinally and laterally. Thus, in Figure 9, it will be seen that the point 80 is nearer to the web of the beam 75 than the point 81; while in Figure 8, it will be seen that the point 80 is nearer to the abutment of the two columns than the point 81. This offset relationship, particularly the one illustrated in Figure 8, causes the jaw to engage the flange 74 more firmly as the tie portions 70 is shortened.

Obviously, innumerable other modifications may be constructed, and the features herein described and illustrated may be combined in a variety of ways. Although I find it preferable to engage the beams in a positive manner at the webs thereof, nevertheless in certain instances this type of engagement may be supplanted by engagement of the flanges as shown in Figures 8 and 9. And although I prefer the perforated webs because of their simplicity and because of the firmness of engagement which such a construction affords, it will be understood that my invention is broadly not limited to this particular construction. For these reasons, it will be understood that changes in the details herein described and illustrated for the purpose of explaining the nature of my invention may be made by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is:—

1. For use in the process of erecting a steel structure which includes two abutting structural steel beams at least one of which has a web and a flange, a temporary tie device removably applicable to said beams to retain them in abutting relationship, said device comprising a medial tie portion provided with means for adjusting the length thereof, and means associated with the opposite ends of said medial portion for engaging said beams, said last-named means including jaws which pass completely through said web.

2. For use in the process of erecting a steel structure which includes two abutting structural steel beams at least one of which has a flange and a perforated web, a temporary tie device removably applicable to said beams to retain them in abutting relationship, said device comprising a medial tie portion provided with means for adjusting the length thereof, a loop at each end of said medial portion, and means associated with said loops for engaging said beams, said last-named means including a pair of jaws carried by one of said loops and adapted to extend around said flange and through said perforated web.

3. In a temporary steel structure which includes two flanged and webbed structural steel beams abutting end to end, an independent tie device removably applicable to said beams to hold them in abutting relationship, said device comprising a medial tie portion provided with means for adjusting the length thereof and adapted to lie alongside of said beams substantially parallel thereto, and means associated with the opposite ends of said medial portion for engaging the webs of said beams, said last-named means including jaws which pass completely through said web.

4. In a temporary steel structure which includes two flanged and webbed structural steel beams abutting end to end, an independent tie device removably applicable to said beams to hold them in abutting relationship, said device comprising a medial tie portion provided with means for adjusting the length thereof and adapted to lie alongside of said beams substantially parallel thereto, and means associated with the opposite ends of said medial portion for engaging the webs of said beams; said last-named means including a pair of jaws which pass completely through said web and which are arranged at an angle to said medial portion and adapted to extend around the adjacent beam flange.

5. In a temporary steel structure which includes two flanged and webbed structural steel beams abutting end to end, an independent tie device removbaly applicable to said beams to hold them in abutting relationship, said device comprising a medial tie portion provided with means for adjusting the length thereof and adapted to lie alongside of said beams substantially parallel thereto, and means associated with the opposite ends of said medial portion for engaging the webs of said beams; said last-named means including a pair of jaws arranged at an angle to said medial portion and adapted to extend around the adjacent beam flange and into positive engagement with opposite sides of the corresponding web.

6. In a grasping device for engagement of a structural beam having a flange and a perforated web, a pair of jaws so shaped and constructed as to engage about opposite flange edges and to extend thence in overlapping relationship through said web perforation.

In witness whereof, I have signed and sealed this specification this 7th day of January, 1929.

WALTER H. WEISKOPF.